(12) United States Patent
Pressley et al.

(10) Patent No.: US 8,791,190 B2
(45) Date of Patent: Jul. 29, 2014

(54) STABILIZED AQUEOUS COMPOSITIONS COMPRISING CATIONIC POLYMERS THAT DELIVER PAINT AND PRIMER PROPERTIES IN A COATING

(75) Inventors: Ozzie M. Pressley, Cheltenham, PA (US); Monica A. Luckenbach, Woxall, PA (US); Wei Zhang, Ambler, PA (US); Ronald C. Faulk, Willow Grove, PA (US)

(73) Assignee: Rohm and Haas Company, Philadelphia, PA (US)

( * ) Notice: Subject to any disclaimer, the term of this patent is extended or adjusted under 35 U.S.C. 154(b) by 171 days.

(21) Appl. No.: 13/452,995

(22) Filed: Apr. 23, 2012

(65) Prior Publication Data

US 2012/0277333 A1    Nov. 1, 2012

Related U.S. Application Data

(60) Provisional application No. 61/480,591, filed on Apr. 29, 2011, provisional application No. 61/497,237, filed on Jun. 15, 2011.

(51) Int. Cl.
*C08K 3/32* (2006.01)
*C08J 5/20* (2006.01)

(52) U.S. Cl.
USPC ............................................ 524/417; 521/28

(58) Field of Classification Search
USPC ...................................................... 524/417
See application file for complete search history.

(56) References Cited

U.S. PATENT DOCUMENTS

| | | | |
|---|---|---|---|
| 3,494,878 A | 2/1970 | Harren et al. | |
| 3,926,890 A | 12/1975 | Huang et al. | |
| 3,969,296 A | 7/1976 | Wassenburg et al. | |
| 4,283,499 A | 8/1981 | Howell | |
| 4,733,005 A | 3/1988 | Schmidt et al. | |
| 5,192,446 A | 3/1993 | Salem et al. | |
| 5,312,863 A | 5/1994 | Van Rheenen et al. | |
| 5,922,777 A | 7/1999 | Van Rheenen | |
| 5,947,632 A | 9/1999 | Pirotta et al. | |
| 6,492,451 B1 | 12/2002 | Dersch et al. | |
| 6,696,519 B2 | 2/2004 | Brown et al. | |
| 6,815,466 B2 * | 11/2004 | Van Rheenen | 521/29 |
| 7,803,858 B2 * | 9/2010 | Pressley et al. | 524/115 |
| 8,158,714 B2 * | 4/2012 | Nair et al. | 524/556 |
| 2004/0121173 A1 | 6/2004 | St. Arnauld | |
| 2005/0107527 A1 | 5/2005 | Holub et al. | |
| 2009/0171005 A1 | 7/2009 | Finegan et al. | |
| 2009/0176127 A1 | 7/2009 | Matthews et al. | |

FOREIGN PATENT DOCUMENTS

WO    9925780 A1    5/1999

OTHER PUBLICATIONS

European Search Report issued in EP 12160684.2, dated Aug. 17, 2012.

* cited by examiner

*Primary Examiner* — Hui Chin
(74) *Attorney, Agent, or Firm* — Andrew E. C. Merriam

(57) ABSTRACT

The present invention provides one component aqueous compositions comprising (i) a cationic stain blocking polymer chosen from (a) 0.01 to 7 wt. % of anion exchange resin copolymer gelular or dual morphology beads that have a weight average particle size of from 0.1 to 20 μm and a low copolymerized crosslinker content of from 0.5 to 2.0 wt. %, (b) from 1 to 30 wt. % a crosslinked cationic addition polymer and (c) mixtures thereof, (ii) one or more emulsion copolymer having a copolymerized residue of at least one phosphorus acid monomer, and (iii) a stabilizer of from 0.1 to 2 wt. % of an inorganic phosphorus containing dispersant, and from 0.2 to 5.0 wt. % of a mixture of a nonionic surfactant and an anionic surfactant, both wt. % s based on the total weight of emulsion copolymer solids. The compositions provide stabilized binders for in a single coat primer plus topcoat coatings and paints.

11 Claims, No Drawings

STABILIZED AQUEOUS COMPOSITIONS COMPRISING CATIONIC POLYMERS THAT DELIVER PAINT AND PRIMER PROPERTIES IN A COATING

The present invention relates to one component aqueous compositions comprising an emulsion copolymer having one or more phosphorus acid functional group, a cationic stain blocking polymer, and a stabilizer for use in single coat primer plus topcoat applications having exceptional stain block resistance. More specifically, it relates to aqueous coating compositions comprising cationic stain blocking polymer chosen from anion exchange resin copolymer beads having a weight average particle size of 20 μm or less, preferably, 10 μm or less having a copolymerized crosslinker content of from 0.5 to 2.0 wt. %, a cationic addition copolymer, and mixtures thereof, one or more emulsion copolymer having a copolymerized residue of at least one phosphorus acid monomer, and a stabilizer which includes each of an inorganic phosphorus containing dispersant, a nonionic surfactant and an anionic surfactant, to methods for making the compositions and to methods for using the compositions to form a single coat primer plus topcoat.

Over the last 50 years, the architectural coatings market has seen the slow conversion from solvent-borne (SB) to more environmentally friendly waterborne (WB) technologies. However, one market segment where WB technology has only achieved limited penetration is in the area of stain blocking coating compositions. The resistance to this conversion stems from competition by SB alkyd coatings which have excellent barrier properties that result from their inherent film formation ability and hydrophobic nature.

Numerous attempts have been made over the years to simulate the performance of SB alkyd primers through a combination of hydrophobic and low molecular weight (MW) emulsion polymers. Despite the success of a number of commercial WB products, true alkyd-like stain blocking performance has been difficult to accomplish. An even more challenging problem has been the difficulty of engineering a WB emulsion polymer to deliver excellent primer properties while delivering outstanding top coat performance. In water based emulsion polymer systems, it has proven very difficult to make a coating that forms a complete physical barrier on a coated substrate.

Excellent primer properties such as stain blocking can be obtained when an anion exchange resin with quaternary amine functionality is incorporated into the latex matrix. To achieve topcoat properties, an emulsion copolymer a having phosphorus acid functional group can be combined with the anion exchange resin. However, both paint and binder stability can be difficult to achieve in an emulsion copolymer composition. Specifically, when an anion exchange resin is incorporated in an emulsion copolymer matrix, grit or flocculation will occur primarily because the emulsion copolymer is anionic and is surrounded with other anionic species such as oligomers and surfactants. This colloidal stability problem is exacerbated when a strong acid phosphorus acid functional group is a part of the emulsion copolymer backbone. In addition, anion exchange resin beads do not stay well suspended in an anionic emulsion copolymer (sedimentation stability).

Recently, U.S. Pat. No. 6,815,466B2, to Van Rheenen, disclosed a colloidally and sedimentation stable coating composition containing an anionic ion exchange resin (IER) and an emulsion polymer made in the presence of a nonionic surfactant or a nonionic protective colloid such as polyvinyl alcohol (PVOH) or hydroxyethyl cellulose (HEC). The non-ionically stabilized emulsion polymer forms a structured network with the IER through weak interactions, thereby forming a network that gives the composition colloidal and sedimentation stability without the need for a water soluble film-forming polymer aside from the protective colloid. The resulting composition forms stain resistant coatings. However, the Van Rheenen compositions need the protective colloid to provide the disclosed stability; and the topcoat performance of the Van Rheenen compositions is compromised by the ion exchange resins used therein or by the need to use of amounts of such resins that compromise topcoat performance.

The present inventors have endeavored to solve the problem of providing stable aqueous compositions, especially those having a low VOC (volatile organic compound) content, that deliver primer stain blocking and topcoat performance, including household stain removal and scrub resistance in a coating.

STATEMENT OF THE INVENTION

In accordance with the present invention, one component aqueous compositions comprise (i) a cationic stain blocking polymer chosen from 0.01 to 7 wt. %, based on the total weight of solids in the composition, preferably, 4 wt. % or less, of anion exchange resin copolymer beads that have a weight average particle size of from 0.1 to 20 μm, preferably, 10 μm or less, and have a copolymerized crosslinker content of from 0.5 to 2.0 wt. %, based on the total weight of monomers used to make the anion exchange resin copolymer, preferably, 0.7 to 1.75 wt. %, from 1 to 30 wt. %, based on the total weight of solids in the composition, preferably, 15 wt. % or less, of a crosslinked cationic addition polymer which has from 20 wt. % to 96 wt. %, based on the total weight of monomers used to make the copolymer, of the copolymerized residue of a monomer chosen from a cationic monomer, a monomer that is modified to contain a cation and mixtures thereof, from 4 to 30 wt. % or, preferably, from 10 to 25 wt. %, of a crosslinking monomer, and the remainder of an one or more other monoethylenically unsaturated monomer, such as methyl methacrylate, and mixtures thereof, (ii) one or more emulsion copolymer having a copolymerized residue of at least one phosphorus acid monomer, preferably, having in addition a copolymerized residue of an acid-functional or anionic monomer, and having an anionic surfactant or its polymerization residue and a reductant or its polymerization residue, and (iii) a stabilizer of from 0.1 to 2 wt. %, based on the total weight of emulsion copolymer solids, of an inorganic phosphorus containing dispersant, and from 0.2 to 5.0 wt. %, based on the total weight of emulsion copolymer solids, of a mixture of a nonionic surfactant and an anionic surfactant, wherein when the cationic stain blocking polymer is an anion exchange resin bead it is chosen from gelular beads, beads having a dual morphology, and mixtures thereof.

The composition of the present invention may comprise a stabilized binder for coating and paint compositions; or, it can be combined with pigments and/or extenders to form coating and paint compositions. The coating compositions of the present invention can be pigmented or unpigmented, and may comprise opacifiers, such as $TiO_2$, void containing polymers or their admixtures. Such coating compositions are, preferably, low VOC compositions having a VOC content of from 0 g/l to 150 g/l, or, preferably, less than 100 g/l.

The cationic stain blocking polymer of the present invention preferably has quaternary ammonium groups.

Preferably, to provide enhanced scrub resistance, the emulsion copolymer of the present invention includes the copolymerized residue of one or more unsaturated beta-dicarbonyl monomer or unsaturated cyanocarbonyl monomer, which may be in the enamine form.

Preferably, the stabilizer of the present invention comprises as the inorganic phosphorus containing dispersant a tetrasodium pyrophosphate (TSPP) or another inorganic phosphorus compound having multiple phosphorus-containing functional groups.

Preferably, the stabilizer of the present invention comprises as nonionic surfactant an alkoxylated alkyl ether having from 10 to 40 alkoxy groups or alkylphenyl ether having from 10 to 40 alkoxy groups.

The stabilizer of the present invention preferably comprises as an anionic surfactant at least one phosphorus containing surfactant, such as, for example, one chosen from a phosphate surfactant, a phosphonate surfactant, and mixtures thereof. Preferably, the phosphorus containing surfactant is an alkyl alkoxylated phosphate, such as, for example, an alkyl ethoxylated phosphate.

The stabilizer of the present invention may further comprise one or more chelating agent.

In one aspect of the present invention, where the cationic stain blocking polymer is a crosslinked cationic addition polymer the stabilizer simply comprises anionic surfactant in the amount of from 0.1 to 2 wt. %, based on the total weight of emulsion copolymer solids, or, preferably, up to 1.5 wt. %.

The present invention also provides methods for using the coating compositions of the present invention as a single coat primer plus topcoat comprising applying the coating composition to a substrate which has no primer on it to form a coating having improved stain block resistance.

In another aspect, the present invention provides methods for making aqueous compositions comprising aqueous emulsion polymerizing at least one ethylenically unsaturated monomer, one or more phosphorus acid monomer and, preferably, one or more acid-functional or anionic monomer, in the presence of a free radical redox initiator system, preferably, including both a water-soluble oxidizing agent and a water-insoluble oxidizing agent, and in the presence of an anionic surfactant to form the emulsion copolymer; and, formulating the emulsion copolymer as a binder with a stabilizer of which includes each of an inorganic phosphorus containing dispersant having multiple phosphorus-containing functional groups, a nonionic surfactant and an anionic surfactant, and with a cationic stain blocking polymer chosen from an amount of 0.01 to 7 wt. %, based on the total weight of solids in the composition, of anion exchange resin copolymer beads having a weight average particle size of 20 μm or less, preferably, 10 μm or less, and having a copolymerized crosslinker content of from 0.5 to 2.0 wt. %, based on the total weight of monomers used to make the anion exchange resin copolymer, an amount of from 1 to 30 wt. %, based on the total weight of solids in the composition, of a crosslinked cationic addition polymer, and mixtures thereof. The binder can be formulated with a pigment grind and additives, such as rheology modifiers, coalescents, defoamers and surfactants to form a coating composition.

Preferably, to reduce the residual monomer content within the aqueous emulsion copolymer, it is treated with a redox pair after polymerization.

As used herein, the term "beta-dicarbonyl monomer" includes ethylenically unsaturated acetoacetoxy-functional monomers and ethylenically unsaturated acetoacetamido-functional monomers, and the term "cyanocarbonyl monomer" includes ethylenically unsaturated cyanoacetoxy-functional monomers, and ethylenically unsaturated cyanoacetamido-functional monomers.

As used herein, the term "calculated Tg" refers to the glass transition temperature of a polymer made from a mixture of monomers as calculated by the Fox Equation (T. G. Fox, Bull. Am. Physics Soc. Vol. 1, (1956)).

As used herein, the term "dual morphology" refers to anion exchange resin beads which can be reversibly converted from a dry, gelular morphology to a macroreticular, hydrated morphology by contact with water.

As used herein, the term "gelular" refers to anion exchange resin beads that predominantly contain pores that are less than 30 Å in diameter, and which pores are of a molecular nature as a part of the gel structure. These gel pores are generally synthesized by a method which does not include the use of an inert, co-solvent. A synonym for gelular is microreticular.

As used herein, the term "macroreticular" or "macroporous" refers to anion exchange resins that contain a significant proportion of extra gelular pores that are not a part of the gel structure and are generally greater than 30 Å in diameter. The pores are large compared to atomic dimensions of an associated resin matrix which defines the pores.

As used herein, the term "polymerization residue" or "polymerization product" or "copolymerization residue", "copolymerizate" or "copolymerization product" refers to the form of a material that results from it having been included in a polymerization reaction. So, for monomers, it refers to that portion of the resulting polymer or copolymer that corresponds to the monomer that was polymerized or copolymerized; for surfactants, catalysts and other materials, it refers to the form of such materials as they exist in the product polymer or copolymer.

As used herein, the phrase "solids" or "total solids" refers to weight amounts of any given material in comparison to the total weight amount of all of the non-volatile ingredients in the aqueous composition (e.g. emulsion copolymer(s), anion exchange resins, surfactants, redox compounds, catalysts, pigments, colorants, extenders, non-volatile coalescents, and non-volatile additives).

As used herein, the term "stain resistance" refers to the ability of a coating to resist the stain when the coating is exposed to the staining material, and the term "scrub resistance" refers to the ability of a coating to withstand scrubbing to remove the residual staining material that the coating did not fully resist.

As used herein, the term "weight average particle size" refers to the average particle size of a sample of anion exchange resins as measured on a Mastersizer 2000 (Malvern Instruments Ltd., Malvern, UK).

As used herein, "wt. %" or "wt. percent" means weight percent based on total binder solids of the binder composition as mixed, and prior to any cure. Dehydrated reducing sugars will be considered uncured in the form they are added to the compositions.

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acrylate" encompasses, in the alternative, methacrylate, or acrylate, or mixtures thereof.

The endpoints of all ranges directed to the same component or property are inclusive of the endpoint and independently combinable. Thus, for example, a disclosed range of a ratio of 0.1 to 7 wt. %, preferably, 1 to 4 wt. %, or, more preferably, less than 2.5 wt. %, means any and all of 0.1 to 7 wt. %, 0.1 to 1 wt. %, 0.1 to 2.5 wt. %, 0.1 to 4 wt. %, 1 to less than 2.5 wt. %, 1 to 4 wt. %, 1 to 7 wt. %, 2.5 to 4 wt. %, 2.5 to 7 wt. % and 4 to 7 wt. %.

Unless otherwise indicated, conditions of temperature and pressure are room temperature (~20-22° C.) and standard pressure, also referred to as "ambient conditions".

The present applicants have discovered a way to stabilize an aqueous composition that delivers the excellent stain blocking performance of a solvent borne alkyd primer as well as exceptional opacity and adhesion of a primer coat, while providing excellent topcoat performance in gloss, smoothness, household stain removal and scrub resistant surface properties. The aqueous compositions have an emulsion copolymer containing the copolymerization residue of a phosphorus acid monomer, a cationic stain blocking polymer and a stabilizer which includes an inorganic phosphorus containing dispersant having multiple phosphorus-containing functional groups. The present inventors have found that the inorganic phosphorus containing dispersant significantly improves paint makeability to give a low rise in Kreb's Units (KU) over time and keeping viscosity within stable limits. In addition, the present inventors have surprisingly discovered that the compositions of the present invention provide improved rheology modifier (RM) efficiency in use, so the amount of RM needed to increase viscosity to a desired level in a coating formulation is lowered.

The stabilizer of the present invention comprises an inorganic phosphorus containing dispersant which may be any such compound having multiple phosphorus-containing functional groups, such as multiple phosphate, phosphonate or (hypo)phosphate groups. Suitable inorganic phosphorus containing dispersants may include, for example, tetrasodium pyrophosphate (TSPP), sodium hexametaphosphate (SHMP), diammonium phosphate (DAP), and potassium tripolyphosphate (KTPP).

In the aqueous compositions of the present invention, the amount of the inorganic phosphorus containing dispersant may range from 0.1 to 2 wt. %, based on the total weight of solids in the composition, preferably, 1.5 wt. % or less, or, preferably 0.3 wt. % or more. Excessive amounts of the inorganic phosphorus containing dispersant may impair hiding, gloss and tint strength.

In addition to the inorganic phosphorus containing dispersant, the stabilizer of the present invention also comprises one or more nonionic surfactant and one or more anionic surfactant.

Suitable anionic surfactants may include, for example, phosphorus containing surfactants and sulfur containing surfactants, such as fatty sulfates or their salts, e.g. sodium lauryl sulfate; fatty sulfonates, arylalkylsulfonates or their salts, such as sodium dodecylbenzene sulfonate. Preferably, to achieve optimum stain resistance, when the cationic stain blocking polymer is an anion exchange resin, the anionic surfactant is a phosphorus containing surfactant.

Suitable phosphorus containing surfactants may be used in the acid form or in the salt form and may be any organic compound containing a phosphorus group and a hydrophobic moiety, such as a phosphate, phosphate ester, or phosphonate group, for example, an alkyl ethoxylated phosphate. One suitable phosphorus containing surfactant is a polyoxyethylene tridecyl ether phosphate.

A suitable alkyl ethoxylated phosphate surfactant may have a $C_8$ to $C_{30}$ alkyl group, preferably, a $C_{12}$ to $C_{18}$ alkyl group, attached to a polyoxyethylene chain having an average degree of polymerization in the range of from 2 to 100. The alkyl ethoxylated phosphate surfactant may be represented by the structure: $R\text{-}(EO)_n\text{-}OPO_3X_2$ wherein R is a $C_8$ to $C_{30}$ alkyl group; EO is a polymerized ethylene oxide unit; n is an integer with a value in the range of from 2 to 100, preferably, from 5 to 50; and each X is independently selected from H or a cation. Examples of suitable cations include alkali metal cations such as lithium, sodium, or potassium; ammonia; and amines such as dimethyl amine, triethanol amine, and methyl amine.

One suitable phosphorus containing surfactant is Rhodafac RS-960, an alkyl alkoxyether phosphate with 50 ethoxy (EO) units, made by Rhodia (Cranbury, N.J.).

Suitable nonionic surfactants may include alkylalkoxylates and alkylphenyl alkoxylates having, preferably, 20-40 alkoxy groups. One example of a suitable nonionic surfactant is Tergitol™ 15-S-20 (The Dow Chemical Company, Midland, Mich.).

The desired amount of each of the anionic surfactant and the nonionic surfactant may range from 0.1 to 2 weight %, preferably, 0.2 to 1.5 weight %, based on the weight of emulsion copolymer solids. The total amount of the combination of nonionic and anionic surfactants may range from 0.4 to 5 wt. %, based on the total weight of emulsion copolymer solids, preferably, 0.5 to 3 wt. %. Too much of such surfactants can impart water sensitivity to coatings made from the aqueous compositions of the present invention. Too little of such surfactants may not impart formulation stability to the aqueous compositions of the present invention.

The stabilizer of the present invention may further comprise a chelating agent. Suitable chelating agents may include, for example, ethylenediaminetetraacetic acid tetrasodium salt or ethylenediamine or nitrilotriacetic acid.

In the aqueous compositions of the present invention, the amount of chelating agent may range from 0.01 to 1.0 wt. %, based on the total weight of solids in the composition, preferably, 0.05 to 0.5 wt. %.

The cationic stain blocking polymer of the present invention can comprise an anion exchange resin copolymer or resin or a crosslinked cationic addition polymer.

To retain suitable topcoat properties, anion exchange resins of the present invention have the highest diffusion capacity for absorbing staining materials so as act most efficiently and in the lowest concentrations, thereby improving composition stability and topcoat properties in coatings made from the composition. Anion exchange resins are ion exchange resin particles having a positively charged surface and positively charged sites throughout the particles that hold and exchange negatively charged ions, even if ground to low average particle size. The positively charged sites may be, for example copolymers of styrene or divinylbenzene which are chloromethylated and then reacted to form quaternary ammonium groups therein by means of tertiary amines or to form simple amine groups by means of primary or secondary amines. Such anion exchange resins are gelular or have a dual morphology. In contrast, with a macroporous anion exchange resin, the functionality is on the surface.

In anion exchange resins, the polymer bearing the exchange groups is crosslinked and insoluble in water. The level of crosslinker in these resins is a compromise between processability of the resin in a packed bed column or chemical reactor and diffusion of other materials between the chains of the polymer. A lightly crosslinked polymer, such as those used in forming gelular beads and dual morphology beads allows for the best diffusion of contaminates through the resin to the functional groups. While such lightly crosslinked beads may deform or be damaged in processing in an ion exchange column or medium, the anion exchange beads of the present invention are not subject to such processing forces in coatings applications. At the lower limit of crosslinking, the anion exchange resin polymer expands to the point which it takes up too much volume in the paint or coating or is soluble in aqueous media. Accordingly, it is desirable to have a low level of crosslinking in the anion exchange resin, such as, for example, from 0.5 to 2 wt. %, based on the total weight of monomers used to make the anion exchange resin copolymer, or, preferably, 0.7 wt. % or more to less than 2.0 wt. %, or, preferably, 1.75 wt. % or less.

In suitable anion exchange resins of the present invention, the backbone of the resin may be crosslinked styrene, acrylic, phenol formaldehyde or other hydrolytically stable polymer. Preferred backbones are crosslinked acrylic and crosslinked styrene; most preferred is crosslinked styrene. Anion exchange resins suitable for stain blocking in coating compositions include those containing functional groups capable of binding stain bodies, such as, for example, quaternary amines, amino phosphonic, amino diacetic, glucamine or other anion exchange groups. Preferred exchange groups may include, for example, quaternary ammonium groups such as those made by functionalizing chloromethyl polystyrene with trimethyl amine, trimethanol amine, tributyl amine or other trialkyl amines, most preferably, trimethyl amine. Alternatively, suitable ion exchange resins may comprise functionalized crosslinked acrylic copolymers such as a copolymer of dimethylaminopropyl acrylamide and divinyl benzene (DVB) quaternized with methyl iodide. Other options would be to use a phenol formaldehyde resin which has been functionalized with trialkyl ammonium groups or a condensation reaction between at least one polyamine and epichlorohydrin. It is possible to choose selective functional groups to remove specific contaminates. Examples of polymers and functional groups which may be used to make the anion exchange resins can be found in Arshady, R., Margel, S., Pichot, C., and Delair, T., *Preformed Microspheres*, MML Series, Volume 1, Chapter 6 "Functionalization", 1999 Citus Books, pp. 169-195; and in U.S. Pat. No. 3,494,878 to Harren et al. Materials such as "Merrifield's Resin" (Chloromethylated Polystyrene with 1% DVB) which has been aminated with a trialkyl amine would be quite suitable.

The amount of cationic groups in the anion exchange resin of the present invention may range from 0.5 to 2.0 cation groups, e.g. quaternary ammonium, per monomer, e.g. styrene, acrylate or epichlorohydrin excluding crosslinkers.

The weight average particle size of the anion exchange of the present invention resin should range from 0.1 to 20 µm, or, preferably 10 µm or less, or, preferably 5 µm or less, or, preferably, 0.5 µm or more or, more preferably, 3 µm or more or up to 8 µm. Such particle sizes should be low enough to provide film formation without texture or grit (aka colloidal stability) and to enable sedimentation stability (shelf stability) in water; at the same time, an anion exchange resin having too low of a particle size complexes anionic surfactant, phosphorus containing surfactant and the emulsion copolymer having copolymerized phosphorus acid monomer and thereby impairs shelf stability and topcoat performance.

Suitable amounts of anion exchange resin beads may range from 0.1 to 7 wt. %, based on the total weight of solids in the composition, preferably, from 1 to 4 wt. %, or, more preferably, less than 2.5 wt. %. While more anion exchange resin means better stain resistance, as the ion exchange resin absorbs water, too much of it could ruin topcoat properties. At a low concentration of, e.g. 1 to 2 wt. %, based on the total weight of solids in the composition, anion exchange resins enable the compositions of the present invention to provide excellent stain blocking primer performance while maintaining superior top coat properties.

Suspension polymerization processes may be used to make the anion exchange resin of the present invention and are well known in the art; see for example U.S. Pat. No. 4,283,499. Typically, suspension polymerization produces crosslinked polystyrene ion exchange resins having a weight average particle size of approximately 100 to 500 µm. Anion exchange resins can also be made via conventional polymerization in bulk in and aqueous emulsion polymerization. Emulsion polymerized anion exchange resin copolymers may have a desired weight average particle size (0.1 to 1 µm) from emulsion polymerization.

To reduce their particle size, anion exchange resins may be ground by any milling equipment suitable for producing beads in the size range of the present invention. Suitable mills are attrition mills, fluid-energy mills, colloid mills, vibratory ball mills (vibro-energy mills), pin mills, ball mills, roller mills, and autogenous and semiautogenous mills. Likewise a combination of mills could be used to possibly increase speed where the first mill reduces particle size to, for example, less than 100 µm and a second mill reduces the particle size further to the desired range. An example would be the initial use of a hammer mill followed by a semiautogenous mill like a Dyno-Mill® from CB Mills Inc (Buffalo Grove, Ill.). Where grinding is necessary, the anion exchange resins of the present invention are more easily ground in the wet state. For example, the anion exchange resin can be ground in the presence of an emulsion copolymer or first ground and then blended with the emulsion copolymer. Agitators such as a Red Devil Paint Conditioner, Model #5410-00 (Union, N.J.) could also be used with appropriate milling media, e.g. zirconia.

The crosslinked cationic addition polymers of the present invention comprise emulsion copolymers which are the copolymerization product of a monomer chosen from a cationic monomer, a monomer that is modified to contain a cation and mixtures thereof with one or more crosslinking monomer, such as glycol(meth)acrylates, divinyl benzene, allyl methacrylate or other monomers having two ethylenically unsaturated groups. Such emulsion copolymers have a weight average particle size of 1.0 µm or less and so do not require grinding.

The crosslinked cationic addition polymer comprises cationic functional groups which are, preferably, quaternary ammonium groups. This stain blocking copolymer may contain cationic monomers or monomers that are modified to contain a cation. Suitable monomers that are modified to contain a cation may include base functional monomers like dimethyl aminopropyl methacrylamide (DMAPMA); and weak base functional monomers, such as tertiary amine functional (meth)acrylates or tertiary amine functional addition monomers such as, for example, methylaminoethylethyl methacrylate (DMAEMA), (dimethylamino)ethyl(meth) acrylate, 2-(dimethylamino)ethyl(meth)acrylamide, 2-(t-butylamino)ethyl(meth)acrylate, 3-(dimethylamino)propyl (meth)acrylamide, 2-(diethylamino)ethyl(meth)acrylate, 2-(dimethylamino)ethyl(meth)acrylamide, 4-vinyl pyridine, 2,6-diethyl-4-vinyl pyridine, 3-dodecyl-4-vinyl pyridine, and 2,3,5,6,-tetramethyl-4-vinyl pyridine. Suitable cationic monomers are the quaternized form of base or weak base functional monomers, such as weak base functional monomers which have been reacted with alkyl halides, such as for example benzyl chloride and the like, or with epoxides, such as propylene oxide and the like, or with dialkyl sulfates, such as dimethyl sulfate and the like, can also be used.

Some quaternized forms of weak base monomers are very water soluble and may be difficult to incorporate into latex polymers by emulsion polymerization. An alternate method of making a quaternary amine functional emulsion copolymer is to post-functionalize the copolymer emulsion polymerization. This can be done as described in U.S. Pat. No. 3,926,890 where haloalkyl ester monomers such as for example 2-chloroethyl acrylate and the like, are incorporated into a latex. These latexes are then post-alkylated by reaction with tertiary amines. Alternately, latexes can be made with glycidyl monomers like glycidyl methacrylate and post reacted with amines (tertiary amines to form quaternary groups) as taught in U.S. Pat. No. 3,969,296.

Additionally, weak base functional latexes can also be postreacted with alkylating agents such as, for example, benzyl chloride, epoxides as discussed above for monomers, as taught in U.S. Pat. No. 5,312,863.

Where the crosslinking monomer and the monomer that is cationic or modified to contain a cation amounts less than 100 wt. % of the monomers used to make the crosslinked cationic addition polymer, the polymer also comprises the addition copolymerization product of other monoethylenically unsaturated monomers. Suitable other monomers may include, for example, the monomers for making soft copolymers (ii) and the other monoethylenically unsaturated monomers (iii) used to make the emulsion copolymer, both described below, for example, alkyl(meth)acrylate, styrene or alkyl(meth)acrylamide monomers.

One suitable cationic stain blocking polymer is a copolymer of dimethylaminopropyl acrylamide and from 4 to 30 wt. %, based on the total weight of monomers used to make the polymer, of divinyl benzene (DVB) quaternized with methyl iodide.

The aqueous emulsion copolymer of the present invention comprises the polymerization residue of a phosphorus acid monomer. The emulsion copolymer may be the polymerization product of (i) from 0.3 to 3.0 wt. %, based on the total weight of monomers used to make the emulsion copolymer, of the phosphorus acid monomer or, preferably, 0.5 to 2.5 wt. % or more of such monomer, or, preferably, up to 0.6 to 2 wt. % of such monomer; (ii) 20 wt. % or more, based on the total weight of monomers used to make the emulsion copolymer, of one or more monomers for making soft copolymers chosen from ethyl acrylate, methyl acrylate, butyl acrylate, benzyl acrylate, ethylhexyl acrylate, 2-ethylhexyl methacrylate, hexyl methacrylate, octyl methacrylate, fatty acid methacrylates, such as lauryl methacrylate, stearyl(meth)acrylate, cetyl(meth)acrylate or eicosyl methacrylate, and mixtures thereof, preferably, chosen from ethyl acrylate, butyl acrylate, ethylhexyl acrylate, and mixtures thereof; and (iii) up to 79.7% wt. %, based on the total weight of monomers used to make the emulsion copolymer, of one or more other monoethylenically unsaturated monomers excluding monomers (i) and (ii).

Preferably, the emulsion copolymer of the present invention further comprises anionic functional groups, such as, for example, carboxylic acids, anhydrides, aldehydes and amides mixtures thereof and combinations thereof.

Examples of suitable phosphorus acid monomers include dihydrogen phosphate esters of an alcohol in which the alcohol also contains a polymerizable vinyl or olefinic group, such as allyl phosphate; mono- or diphosphate of bis(hydroxymethyl)fumarate or itaconate; derivatives of (meth)acrylic acid esters, such as, for example, phosphates of hydroxyalkyl-(meth)acrylate including 2-hydroxyethyl-(meth)acrylate, 3-hydroxypropyl-(meth)acrylates, and the like. Thus, dihydrogen phosphate ester monomers include phosphoalkyl(meth)acrylates, such as 2-phosphoethyl(meth)acrylate, 2-phosphopropyl(meth)acrylate, 3-phosphopropyl (meth)acrylate, phosphobutyl(meth)acrylate and 3-phospho-2-hydroxypropyl(meth)acrylate. For purposes of the present invention, phosphoalkyl(meth)acrylates include ethylene oxide condensates of (meth)acrylates such as $H_2C=C(CH_3)COO(CH_2CH_2O)_nP(O)(OH)_2$, and the analogous propylene oxide condensates similarly, where n is from 1 to 50 in each case. Phosphoalkyl crotonates, phosphoalkyl maleates, phosphoalkyl fumarates, phosphodialkyl(meth)acrylates, phosphodialkyl crotonates, and allyl phosphate can all be used. Other suitable phosphorus-containing monomers are phosphonate-functional monomers, such as those disclosed in WO 99/25780 A1, and include vinyl phosphonic acid, allyl phosphonic acid, 2-acrylamido-2-methylpropanephosphinic acid, α-phosphonostyrene, and 2-methylacrylamido-2-methylpropanephosphinic acid. Still other suitable phosphorus-containing monomers are 1,2-ethylenically unsaturated (hydroxy) phosphinylalkyl(meth)acrylate monomers, such as disclosed in U.S. Pat. No. 4,733,005, and include (hydroxy)phosphinylmethyl methacrylate.

Preferred phosphorus-containing monomers (i), are phosphates of hydroxyalkyl methacrylates, with 2-phosphoethyl (meth)acrylate (PEM) being the most preferred.

Suitable other monoethylenically unsaturated monomers (iii) may include monomers such as, for example, (meth) acrylic ester monomers including, for example, $C_1$ to $C_{30}$ (cyclo)alkyl(meth)acrylates, such as, for example methyl methacrylate, ethyl methacrylate, butyl methacrylate, decyl acrylate, (meth)acrylamide, substituted (meth)acrylamides, such as N-alkyl(meth)acrylamides and N,N-dialkyl(meth) acrylamides; ethylene; propylene; styrene and substituted styrenes; butadiene; vinyl esters, such as vinyl acetate and vinyl butyrate; vinyl chloride, vinyl toluene, and vinyl benzophenone; (meth)acrylonitrile; and vinylidene halides, such as, vinylidene chloride; and mixtures thereof.

Preferably, the other monoethylenically unsaturated monomers (iii) used to make the emulsion copolymer of the present invention may include acid-functional or anionic monomers for added composition stability. In a preferred embodiment, the emulsion copolymer may comprise acid-functional or anionic monomer copolymerizate in amounts of from 0.1 to 2.0 wt. %, based on the total weight of monomers used to make the emulsion copolymer, or, preferably 0.2 to 1.0 wt. %, or, more preferably 0.4 to 0.6 wt. %.

Suitable acid-functional or anionic monomers may be, for example, monoethylenically unsaturated carboxylic acid, anhydride or amide monomers such as, for example, acrylic acid, methacrylic acid, maleic acid, maleic anhydride, monomethyl itaconate, monomethyl fumarate, and maleic anhydride; salts thereof, e.g. sodium acrylic acid; monomers containing sulfur acid groups, such as, for example, 2-acrylamido-2-methyl-1-propanesulfonic acid, sulfoethyl(meth) acrylate, sodium styrene sulfonate, and vinyl sulfonic acid; (meth)acrylamide, substituted (meth)acrylamides, such as N-alkyl(meth)acrylamides and N,N-dialkyl(meth)acrylamides; and N-methylol(meth)acrylamide. Preferred anionic monomers are (meth)acrylic acid, itaconic acid, fumaric acid and maleic acid.

Preferably, to provide enhanced scrub resistance, the other monoethylenically unsaturated monomers (iii) used to make the emulsion copolymer of the present invention include one or more beta-dicarbonyl monomer or cyanocarbonyl monomer, which may be in the enamine form, preferably, also comprising acid-functional or anionic monomers. One such suitable emulsion copolymer comprises from 0.5 to 5.0 wt. %, based on the total weight of monomers used to make the emulsion copolymer, or, preferably 1.0 to 3.0 wt. %, of the copolymerized residue of a beta-dicarbonyl monomer or a cyanocarbonyl monomer. In one such embodiment, the beta-dicarbonyl monomer or cyanocarbonyl monomer is selected from the group consisting of: acetoacetoxy-functional monomers, acetoacetamido-functional monomers, cyanoacetoxy-functional monomers, and cyanoacetamido-functional monomers, and combinations thereof. For example, the beta-dicarbonyl monomer or cyanocarbonyl monomer may be acetoacetoxyethyl methacrylate (AAEM).

Suitable acetoacetoxy-functional monomers may include, for example, acetoacetoxyethyl(meth)acrylate, acetoacetoxypropyl(meth)acrylate, allyl acetoacetate, acetoacetoxybutyl(meth)acrylate, 2,3-di(acetoacetoxy)propyl(meth)acrylate, and vinyl acetoacetate. In general, any polymerizable hydroxy-functional monomer can be converted to the corresponding acetoacetate by reaction with a diketene or other suitable acetoacetylating agent.

Suitable acetoacetamido-functional monomers may include, for example, acetoacetamidoethyl(meth)acrylate, acetoacetamidopropyl(meth)acrylate, acetoacetamidobutyl(meth)acrylate, 2,3-di(acetoacetamido)propyl(meth)acrylate, allyl acetoacetamide, and vinyl acetoacetamide; likewise cyanoacetoxy-functional monomers are also suitable, such as, for example, cyanoacetoxyethyl(meth)acrylate, cyanoacetoxypropyl(meth)acrylate, cyanoacetoxybutyl(meth)acrylate, 2,3-di(cyanoacetoxy)propyl(meth)acrylate, allyl cyanoacetate, and vinyl cyanoacetate; as well as cyanoacetamido-functional monomers, such as, for example, cyanoacetamidoethyl(meth)acrylate, cyanoacetamidopropyl(meth)acrylate, cyanoacetamidobutyl(meth)acrylate, 2,3-di(cyanoacetamido)propyl(meth)acrylate, allyl cyanoacetamide, and vinyl cyanoacetamide.

Free radical addition polymerization techniques that can be used to prepare the emulsion copolymer of the present invention and the crosslinked cationic addition polymer of the present invention are well known in the art.

Anionic surfactants may be used in aid of polymerization such as, for example, nonionic alkali metal or ammonium salts of alkyl, aryl, or alkylaryl sulfates, sulfonates or phosphates; alkyl sulfonic acids; sulfosuccinate salts; fatty acids. Nonionic surfactants may also be included such as, for example, ethylenically unsaturated surfactant monomers and ethoxylated alcohols or phenols. The amount of surfactant used is usually 0.1 to 6 wt. %, based on the weight of monomers used to make the (co)polymer.

The emulsion copolymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all cases, the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. The polymerization techniques used to prepare such multistage emulsion polymers are well known in the art such as, for example, U.S. Pat. Nos. 4,325,856, 4,654,397, and 4,814,373.

One preferred emulsion copolymer is a two stage copolymer including in the second stage a monomer mixture that will form a copolymer that has a measured glass transition temperature (calculated Tg) of at least 10° C. greater than the calculated Tg of the first stage of the emulsion copolymer. The second stage monomer mix may be used in the amount of at least 3 wt. %, and up to 15 wt. %, based on the total weight of monomers used to make the emulsion copolymer.

To enhance scrub resistance, the emulsion copolymers of the present invention are copolymerized using a free radical redox initiator system under emulsion polymerization conditions, the redox initiator system composed of a water-soluble oxidizing agent, an water-insoluble oxidizing agent, and a reducing agent; and effecting the polymerization of at least some of the ethylenically unsaturated monomer. Preferably, the reducing agent is a sulfinic acid, or salts thereof.

From 0.01% to 3.0%, preferably 0.02 to 1%, more preferably 0.05% to 0.5%, by weight of oxidizing agent is used, based on the total weight of monomers used to make the emulsion copolymer. The oxidizing agent includes a water-soluble oxidizing agent such as, for example, hydrogen peroxide and ammonium or alkali metal persulfates, perborates, peracetates, peroxides, and percarbonates; and a water-insoluble oxidizing agent such as, for example, benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate. By "water-insoluble oxidizing agent" herein is meant an oxidizing agent which has a water solubility of less than 20% by weight in water at 25° C.

In addition, redox reaction catalyzing metal salts of iron, copper, manganese, silver, platinum, vanadium, nickel, chromium, palladium, or cobalt may be used at a level of 0.01 to 25 ppm, with or without metal complexing agents. Preferably iron or copper may be used. More preferably, 0.01 to 10 ppm copper may be used.

Suitable reducing agents may include, for example, isoascorbic acid, (meta)bisulfites and sulfinic acid reducing agents.

Preferred sulfinic acid reducing agents, or salts thereof may include, for example, alkylsulfinic acids such as isopropyl sulfinic acid; aryl sulfinic acids such as phenylsulfinic acid; and hydroxyalkyl sulfinic acids such as hydroxymethane sulfinic acid and 2-hydroxy-2-sulfinatoacetic acid and salts of the preceding acids. These are used at a level of 0.01% to 3.0%, preferably 0.01 to 0.5%, more preferably 0.025% to 0.25%, by weight based on the total weight of monomers used to make the emulsion copolymer. A preferred reducing agent is 2-hydroxy-2-sulfinatoacetic acid.

At least some, or, preferably, at least 40 wt. %, or, more preferably, at least 75 wt. %, or, most preferably, at least 95 wt. %, based on dry polymer weight, of the emulsion polymer is formed using a redox initiator composed of a water-soluble oxidizing agent, an water-insoluble oxidizing agent, and a reducing agent in the absence of any other oxidizing agent and in the absence of any other reducing agent. The emulsion polymerization is contemplated to include embodiments where some of the polymer is introduced by a polymer seed, formed in situ or not, or formed during hold periods or formed during periods wherein the monomer feed has ended and residual monomer is being converted to polymer.

According to the present invention, once the emulsion copolymer is formed, it is mixed with the cationic stain blocking polymer of the present invention and the stabilizer of the present invention to form a binder.

One method of using the binder composition of the present invention to reduce rheology modifier demand in a coating or paint composition comprises combining the emulsion copolymer of the present invention, the stabilizer of the present invention and the anion exchange resin of the present invention with a sufficient amount of a rheology modifier to attain a set viscosity of 85 KU or greater, or up to 90 KU, or up to 100 KU at room temp and standard pressure. The amount of rheology modifier need to attain the set viscosity is substantially lower than amounts known to date where the reduction may range from approximately 3 to 20 kg/1000 L, preferably, 15 kg/L or less, of a coating formulation.

The aqueous compositions of the present invention can be used directly as a stain blocking coating or primer, or can be formulated with conventional coating materials: Coalescents, glycols, fillers or extenders, pigments, opacifiers, wetting agents, defoamers, biocides, thickeners, etc. as desired.

The composition of the present invention may applied by conventional application methods such as, for example, brushing and spraying methods such as, for example, roll coating, doctor-blade application, printing methods, air-atomized spray, air-assisted spray, airless spray, high volume low pressure spray, and air-assisted airless spray. Typical substrates to which the composition of the invention may be applied include, plastic, wood, metal, plastic, wall board, primed surfaces, previously painted surfaces, and cementitious substrates. Preferred substrates are interior household surfaces that have not been primed, such as wood, veneer, gypsum and wall board.

The substrate may have disposed upon it markings such as those from marking pens, which contain stain bodies such as tannins where such stains are capable of appearing on the surface of a dry later-deposited coating stains from the substrate, or from sources external to the substrate (for example cigarette smoke) become solubilized or dispersed in wet coating compositions applied to the substrate. The composition of the invention blocks and/or locks in the stains so that they cannot appear on the visible surface of dry coatings.

After application, the composition of the present invention is typically dried, or allowed to dry, at a temperature from 10° C. to 95° C.

EXAMPLES

The following examples illustrate the present invention.

Synthesis Example 1

Emulsion Copolymer

A first monomer emulsion was prepared by mixing 100 g of deionized water, 5.20 g (30% active) $C_{12}$ to $C_{15}$ alkyl ethoxylate sulfate anionic surfactant (Surfactant A), 36 g butyl acrylate, 143.9 g methyl methacrylate, 20 g methacrylic acid, 0.1 g styrene, and 10.2 g of a methyl mercaptan. A second monomer emulsion was prepared by mixing 495 g of deionized water, 79.9 g (30% active) Surfactant A, 468 g butyl acrylate, 540 g ethyl acrylate, 702 g methyl methacrylate, 36 g (60% active) phosphoethyl methacrylate, 36 g acetoacetyloxyethyl methacrylate, and 36 g (50% active) ureido methacrylate.

To a 5-liter, four necked round bottom flask (reactor) equipped with a paddle stirrer, a thermometer, nitrogen inlet, and a reflux condenser was added 700 g of deionized water and 13.4 g (30% active) Surfactant A. The contents of the flask were heated to 86° C. under a nitrogen atmosphere and stirring was initiated. A buffer solution of 2.1 g sodium carbonate dissolved in 25 g of deionized water was added to the flask. A total of 81 g of the first emulsion monomer emulsion was then added, followed by a solution of 4 g ammonium persulfate dissolved in 27 g deionized water. After the reaction temperature peaked, a mixture of a solution of 19.8 g 0.15% w/w ferrous sulfate heptahydrate in water and a solution of 2.9 g of a 1% w/w solution of ethylenediaminetetraacetic acid tetrasodium salt in water was added. Two cofeed solutions were then fed to the flask over a period of 85 minutes: The first cofeed solution was made from 4.0 g of 85% t-amyl hydroperoxide 1.2 g of Surfactant A, and 95 g deionized water; and the second cofeed solution was made from 3.08 g of isoascorbic acid and 100 g deionized water. Two minutes after the start of cofeeds, the remaining first monomer emulsion was fed to the flask over 15 minutes while maintaining the temperature at 86° C.

Once the first monomer emulsion feed was complete, the jar containing the emulsion was rinsed with deionized water, that rinse was added to the flask, the contents of the flask were held at 86° C. for 20 minutes and the cofeeds were suspended. After the 20 minute hold, the cofeeds were resumed, and the second monomer emulsion was fed to the flask over 65 minutes. When 34 wt. % of the second monomer emulsion had been added, 11.3 g ammonium hydroxide (28% w/w aqua ammonia) solution was added to the second cofeed solution. Following the addition of the second monomer emulsion, the jar containing the emulsion was rinsed with deionized water, that rinse was added to the flask, the contents of the flask were held at 86° C. for 15 minutes. After the 15 minute hold, the contents of the flask were cooled to 60° C. and a catalyst/activator pair (tertiary-butyl hydroperoxide/isoascorbic acid) were added to the flask to reduce residual monomer. The polymer was then neutralized to pH 7.7 with an ammonium hydroxide solution. The measured particle size was 137 nm and the solids were 50.3 wt. %.

Synthesis Example 2

Emulsion Copolymer

A first monomer emulsion was prepared by mixing 545 g of deionized water, 82.5 g (30% active) $C_{12}$ to $C_{15}$ alkyl ethoxylate sulfate anionic surfactant (Surfactant A), 456 g butyl acrylate, 570 g ethyl acrylate, 802.75 g methyl methacrylate, 38 g (65% active) phosphoethyl methacrylate, 4.75 g methacrylic acid, 57 g (50% active) ureido methacrylate, and 2.38 g n-dodecylmercaptan. A second monomer emulsion was prepared by mixing 25 g deionized water, 2.6 g (30% active) anionic Surfactant B, 20 g butyl acrylate, and 80 g methyl methacrylate.

To a 5-liter, four necked round bottom flask equipped with a paddle stirrer, a thermometer, nitrogen inlet, and a reflux condenser was added 700 g of deionized water and 13.4 g (30% active) anionic Surfactant A. The contents of the flask were heated to 86° C. under a nitrogen atmosphere and stirring initiated. A buffer solution of 3.2 g ammonium bicarbonate dissolved in 25 g of deionized water was added to the flask. A total of 81 g of the first emulsion monomer emulsion was then added, and this was followed by a solution of 4 g ammonium persulfate dissolved in 27 g deionized water. After the reaction temperature peaked, a mixture made from a solution of 19.8 g 0.15% (w/w) ferrous sulfate heptahydrate in water and a solution of 2.9 g 1% (w/w) solution of ethylenediaminetetraacetic acid tetrasodium salt in water was added. Two cofeed solutions were then fed to the flask over a period of 85 minutes: the first cofeed solution was made from 4.0 g 85% t-amyl hydroperoxide, 1.2 g Surfactant A, and 95 g deionized water, and the second cofeed solution was made from 3.08 g of isoascorbic acid and 100 g deionized water. Two minutes after the start of cofeeds, the remaining first monomer emulsion was fed to the flask over 80 minutes while maintaining the temperature at 86° C.

Once the first monomer emulsion feed was complete, the jar containing the emulsion was rinsed with deionized water, that rinse was added to the flask, the contents of the flask were held at 86° C. for 15 minutes. After the 15 minute hold, the contents of the flask were cooled to 60° C.

At 60° C., the second monomer emulsion was added to the flask, the jar containing the emulsion was rinsed with deionized water, that rinse was added to the flask, a solution of 0.5 g 70% (w/w) t-butyl hydroperoxide in 8 g deionized water and a solution of 0.4 g isoascorbic acid in 12 g deionized water were added in that order. A t-butyl hydroperoxide/isoascorbic acid activator pair was added to the flask to reduce residual monomer. The polymer was then neutralized to pH 8.0 with an ammonium hydroxide solution. The measured particle size was 110 nm and the solids were 49.5%.

Preparation Example 3

Anion Exchange Resin

An anion exchange resin consists of a crosslinked 98.5 wt. % styrene/1.5% divinyl benzene copolymer, based on the total weight of monomers, and containing about 1 quaternary ammonium group per benzene nucleus. The chloride form of the resin was used.

Preparation Example 4

Grinding Anion Exchange Resin

Anion exchange resins having a weight average particle size of about 0.6-0.8 mm and a water content of 45% w/w were ground as follows:

To 200 grams of the anion exchange resin was added 250 grams of water to adjust the polymer solids to 15-20% w/w. This mix was ground for three hours on a Red Devil Paint Conditioner Model #5410-00 (Union, N.J. 07083, USA) using 0.5 inch zirconia media to obtain a weight average particle size of approximately 5 μm as measured on a Mastersizer 2000 (Malvern Instruments Ltd., Malvern, UK). A broad particle size distribution was obtained as indicated on the analysis report, covering the range of about 1 micron to 40 microns.

Example 5

Inorganic Phosphorus Compound with Multiple Phosphorus-Containing Functional Groups A 10 wt. % tetrasodium polyphosphate salt (TSPP) solution in water was prepared by dissolving 10 grams of this material in 90 grams of water.

Example 6

Nonionic Surfactant

A 20 wt. % nonionic $C_{12}$ to $C_{16}$ alkyl alcohol ethoxylate solution in water was prepared by mixing 25 grams of this material (at 80% solids) in 75 grams of water.

Example 7

Anionic Phosphorus Containing Surfactant

A 30 wt. % Anionic $C_{12}$-$O_{18}$ alkyl ethoxylated phosphate solution in water was prepared by mixing 46.15 grams of this material (at 65% solids) in 53.85 grams of water. The sample was then neutralized to a pH of 7.5 with ammonium hydroxide.

Example 8

Anionic Sulfur Containing Surfactant

A 15% Sodium alkylsulfate solution in water was provided.

Some ingredients used in binders and coating formulations are defined, as follows:
Defoamer: Mineral oil-free with polysiloxane
Polyacid Dispersant: Polyacid addition copolymer
Phosphate Dispersant: Inorganic phosphorus compound with multiple phosphorus-containing functional groups
Extender: Nepheline syenite
Coalescent: Organic ester, non-volatile under use conditions
Ropaque™ Polymer: Opaque hollow core polymer
Rheology Modifier: Associative thickener copolymer Example 9

Pigment Grind and Coating Formulation (Control)

The emulsion copolymer of Example 1 was prepared and formulated according to the formulation in Table 1, below, to make a conventional eggshell interior wall paint. The components of the pigment grind were milled on a high speed disk disperser. The grind was added to the letdown between the coalescent and the opaque polymer.

Example 10

Binder Composition

A binder composition was made from the emulsion copolymer of Example 1 at 419.27 g, 24.46 g of the ground anion exchange resin of Example 4, 15.82 grams (g) of the TSPP of Example 5, 16.87 g of the nonionic surfactant of Example 6 and 17.51 g of water. Examples 9 and 10 were tested for paint stability, as shown in Table 4, below.

TABLE 1

Formulation of Aqueous Coating Composition

| Material Name | Amount (grams) |
|---|---|
| Grind | |
| Titanium Dioxide | 274.32 |
| Water | 20 |
| Anionic Phosphate Surfactant | 3.70 |
| Defoamer | 1.0 |
| Polyacid Dispersant | 9.18 |
| Phosphate Dispersant | 2 |
| Extender | 147.73 |
| Attapulgite Clay | 3 |
| Celite 281 | 25 |
| Water | 30 |
| LetDown | |
| Emulsion Copolymer (Example 1) | 419.27 |
| Example 4 | 24.46 |
| Water | 40 |
| Defoamer | 1.0 |
| Coalescent | 11.02 |

TABLE 1-continued

Formulation of Aqueous Coating Composition

| Material Name | Amount (grams) |
| --- | --- |
| Ropaque ™ Polymer | 50 |
| Rheology Modifier | 41.51 |
| Water | 23.87 |

Example 11

(Control) Binder—No Nonionic Surfactant or Inorganic Phosphorus Compound

A control binder was prepared by weighing 200 g of the emulsion copolymer of Example 2 into a 250 mL glass jar and adding 11.84 g of the ground anion exchange resin of Example 4 while mixing in an IKA Labortechnik Eurostar power basic overhead stirrer (Werke Staufen, Germany).

Example 12

(Control) Binder—No Nonionic Surfactant Stabilizer

A binder was prepared in the same manner as Example 11, using 200 g of the composition of Example 2, 11.84 g of the ground anion exchange resin of Example 4 and 7.43 g of the composition of Example 5.

Example 13

(Control) Binder—No Inorganic Phosphorus Compound

A binder was prepared in the same manner as Example 11, using 200 g of the emulsion copolymer of Example 2, 11.84 g of the ground anion exchange resin of Example 4 and 4.95 g of the nonionic surfactant of Example 6.

Example 14

(Control) Binder—No Inorganic Phosphorus Compound

A binder was prepared in the same manner as Example 11, using 200 g of the emulsion copolymer of Example 2, 11.84 g of the ground anion exchange resin of Example 4 and 4.95 g of the anionic surfactant of Example 7.

Example 15

(Control) Binder—No Inorganic Phosphorus Compound Stabilizer

A binder was prepared in the same manner as Example 11, using 200 g of the emulsion copolymer of Example 2, 11.84 g of the ground anion exchange resin of Example 4 and 6.6 g of the anionic surfactant of Example 8.

Example 16

(Control) Binder—No Anionic Surfactant Stabilizer

A binder was prepared in the same manner as Example 11, using 200 g of the emulsion copolymer of Example 2, 11.84 g of the ground anion exchange resin of Example 4, 7.43 g of the inorganic phosphorus compound of Example 5 and 4.95 g of the nonionic surfactant of Example 6.

Example 17

Binder

A Binder was prepared in the same manner as Example 11, using 200 g of the emulsion copolymer of Example 2, 11.84 g of the ground anion exchange resin of Example 4, 7.43 g of the inorganic phosphorus compound of Example 5, 4.95 grams of the nonionic surfactant of Example 6, and 6.6 g of the anionic surfactant of Example 8.

Example 18

Binder

A binder was prepared in the same manner as Example 11, using 200 gm of the emulsion copolymer of Example 2, 11.84 g of the ground anion exchange resin of Example 4, 7.43 g of the inorganic phosphorus compound of Example 5, 4.95 g of the nonionic surfactant of Example 6 and 4.95 g of the anionic surfactant of Example 7.

Examples 11 to 18 where then placed in a 60° C. oven and tested for heat age stability. The compositions were each put in a 60° C. oven overnight. Then they were visually rated for sedimentation using the scale below. A total of 10 cycles was done for Example 10, as it continued to pass. (The test protocol calls for a 10 day cycle or until sample fails.)

| | |
| --- | --- |
| 1 = Very Poor | Heavy layer of hard sediment |
| 2 = Very Poor | Heavy layer of soft sediment |
| 3 = Poor | Moderate sediment |
| 4 = Fair | Slight sediment |
| 5 = Good to Excellent | No sediment |

Stability results are shown in Table 2, below. In Table 2, Example 11, with no stabilizer present (control) provides very poor heat aged stability. The remaining Examples 12-16 show unacceptable stability. Inventive Example 17, with TSPP, a nonionic surfactant, and a sulfur containing anionic surfactant provides much improved and good heat aged stability; and Example 18, with TSPP, a nonionic surfactant and an anionic $C_{12}$-$C_{18}$ alkyl ethoxylated phosphate surfactant, provides excellent heat aged stability.

TABLE 2

Heat-Aged Stability Test Results

| Example | Stability |
| --- | --- |
| Example 11 | 1 |
| Example 12 | 2 |
| Example 13 | 2 |
| Example 14 | 3 |
| Example 15 | 3 |
| Example 16 | 3 |
| Example 17 | 4 |
| Example 18 | 5 |

Example 19

Pigment Grind and Coating Formulation

To 412 g of the emulsion copolymer of Example 1 was added 15.57 g of the inorganic phosphorus compound of Example 5 and 16.7 g of the nonionic surfactant Example 6. Example 19 was then prepared and formulated according to the formulation in Table 3, below, using the procedure described in Example 9.

TABLE 3

Formulation of Aqueous Coating Composition

| Material Name | Amount (grams) |
|---|---|
| Grind | |
| Titanium Dioxide | 296.03 |
| Water | 20 |
| Propylene Glycol | 7 |
| Defoamer | 1.0 |
| Anionic Phosphate Surfactant | 2.47 |
| Polyacid Dispersant | 12.12 |
| AMP-95 | 1 |
| Phosphate Dispersant | 0.75 |
| Extender | 15 |
| Attapulgite Clay | 3 |
| LetDown | |
| Example 19 | 444.27 |
| Water | 50 |
| Defoamer | 2 |
| Ropaque ™ Polymer | 61.44 |
| Coalescent | 7.04 |
| Rheology Modifier | 71.1 |
| Water | 49.8 |

Example 20

Pigment Grind and Coating Formulation with Anion Exchange Resin

The formulation of Example 20 with emulsion copolymer and a ground anion exchange resin was prepared, in the same manner as in Example 19, above, with the exception that in the letdown 60.91 g of the Rheology Modifier and 80.2 g of water were used and, in addition, 29.64 g of the ground anion exchange resin of Example 4 was added.

TABLE 4

Effect of TSPP and Nonionic Surfactant on Paint Stability

| | Example 9 | Example 10 |
|---|---|---|
| Initial KU[1] | 93 | 98 |
| Overnight KU[2] | 113 | 105 |
| Delta KU | 20 | 7 |
| 30-Day KU[3] | 129 | 114 |
| Delta KU from Initial | 36 | 16 |

[1]Initial KU measurement was taken immediately after the paint was finished being made.
[2]Overnight KU was measured after paint equilibrated on the benchtop at room temperature for ~18 hours.
[3]30-Day KU measurement was taken after paint had sat on the benchtop for one month.

As shown in Table 4, above, samples of inventive Example 10 with an inorganic phosphorus compound having multiple phosphorus-containing functional groups and a nonionic $C_{12}$ to $C_{16}$ alkyl alcohol ethoxylate exhibited dramatically improved viscosity stability at room temperature over time compared to the Example 9 (control) without the inorganic phosphorus compound.

TABLE 5

Effect of Rheology Modifier Demand with Ion Exchange Resin

| | Example 19 | Example 20 |
|---|---|---|
| Total Rheology Modifier (wet gm) | 71.10 | 60.91 |
| Initial KU[1] | 88 | 96 |
| Overnight KU[2] | 96 | 100 |
| Delta KU | 8 | 4 |

[1]Initial KU measurement was taken immediately after the paint was finished being made.
[2]Overnight KU was measured after paint equilibrated on the benchtop at room temperature for ~18 hours.

As shown in Table 5, above, the inventive formulation of Example 20 with anion exchange resin beads exhibits better rheology modifier demand, as indicated by the significantly lower amount of rheology modifier needed to produce a desired KU. Example 20 also demonstrates improved stability as indicated by the lower delta KU of the inventive formulation.

Example 21

Emulsion Copolymer Containing Quaternary Amine Functionality

A crosslinked cationic addition polymer comprising the copolymerization product of a monomer mixture of 48 wt. % dimethylamino)ethyl(meth)acrylate (DMAEMA), 32 wt. % methyl methacrylate and 20 wt. % ethylene glycol methacrylate, and quaternized with benzyl chloride. The measured solids were 30%.

Examples 22 and 23

Heat-Aged Stability Testing

Examples 22 and 23 were prepared in the same manner as Example 11, using 200 g of the emulsion copolymer of Example 2. Example 22 contained 16.5 g of the copolymer of Example 21; and Example 23 contained 16.5 g of the copolymer of Example 21 and 6.6 grams of the anionic surfactant of Example 8.

The Examples were tested for heat-aged stability testing, as shown in Table 6.

TABLE 6

Heat-Aged Stability Test Results

| | Stability |
|---|---|
| Example 22 | 1 |
| Example 23 | 5 |

As shown in the above Table 6, the aqueous composition of the present invention in Example 23 with crosslinked cationic addition polymer and sulfur containing anionic surfactant, exhibits far better viscosity stability than the Example 22 composition without the sulfur containing anionic surfactant.

We claim:
1. A one component aqueous composition comprising (i) a cationic stain blocking polymer chosen from 0.01 to 7 wt. %, based on the total weight of solids in the composition, of anion exchange resin copolymer beads that have a weight average particle size of from 0.1 to 20 µm and have a copolymerized crosslinker content of from 0.5 to 2.0 wt. %, based on the total weight of monomers used to make the anion exchange resin copolymer, from 1 to 30 wt. %, based on the total weight of solids in the composition of a crosslinked cationic addition polymer which has from 20 wt. % to 96 wt. %, based on the total weight of monomers used to make the copolymer, of the copolymerized residue of a monomer chosen from a cationic monomer, a monomer that is modified to contain a cation and mixtures thereof, from 4 to 30 wt. % of a crosslinking monomer, and the remainder of an one or more other monoethylenically unsaturated monomer, and mixtures thereof, (ii) one or more emulsion copolymer having a copolymerized residue of at least one phosphorus acid monomer and having an anionic surfactant or its polymerization residue and a reductant or its polymerization residue, and (iii) a stabilizer of from 0.1 to 2 wt. %, based on the total weight of emulsion copolymer solids, of an inorganic phosphorus containing dispersant, and from 0.2 to 5.0 wt. %, based on the total weight of emulsion copolymer solids, of a mixture of a nonionic surfactant and an anionic surfactant, wherein when the cationic stain blocking polymer is an anion exchange resin bead it is chosen from gelular beads, beads having a dual morphology, and mixtures thereof.

2. The composition as claimed in claim 1, wherein the cationic stain blocking polymer is chosen from 0.01 to 4 wt. % of anion exchange resin copolymer beads, based on the total weight of solids in the composition, from 1 to 15 wt. %, based on the total weight of solids in the composition, of a crosslinked cationic addition polymer, and mixtures thereof.

3. The composition as claimed in claim 2, wherein the cationic stain blocking polymer is an anion exchange resin copolymer beads having a weight average particle size of 10 µm or less and having a copolymerized crosslinker content of from 0.7 to 1.75 wt. %, based on the total weight of monomers used to make the anion exchange resin copolymer, based on the total weight of monomers used to make the anion exchange resin copolymer.

4. The composition as claimed in claim 1, wherein the emulsion copolymer of the present invention includes the copolymerized residue of one or more unsaturated beta-dicarbonyl monomer or unsaturated cyanocarbonyl monomer, which may be in the enamine form.

5. The composition as claimed in claim 1, wherein the stabilizer comprises as the inorganic phosphorus containing dispersant a tetrasodium pyrophosphate (TSPP) or another inorganic phosphorus compound having multiple phosphorus-containing functional groups.

6. The composition as claimed in claim 1, wherein the stabilizer comprises as nonionic surfactant an alkoxylated alkyl ether having from 20 to 40 alkoxy groups or alkylphenyl ether having from 20 to 40 alkoxy groups.

7. The composition as claimed in claim 1, wherein the stabilizer comprises as an anionic surfactant at least one phosphorus containing surfactant or a sulfur containing surfactant.

8. The composition as claimed in claim 1, wherein the stabilizer further comprises a chelating agent.

9. A coating composition comprising the aqueous composition as claimed in claim 1 and which is pigmented or unpigmented.

10. A method for making aqueous compositions comprising aqueous emulsion polymerizing at least one ethylenically unsaturated monomer, one or more phosphorus acid monomer and one or more acid-functional or anionic monomer, in the presence of a free radical redox initiator system and in the presence of an anionic surfactant to form (ii) an emulsion copolymer; and, formulating the emulsion copolymer with (iii) a stabilizer of which includes each of from 0.1 to 2 wt. %, based on the total weight of emulsion copolymer solids, of an inorganic phosphorus containing dispersant, and from 0.2 to 5.0 wt. %, based on the total weight of emulsion copolymer solids, of a mixture of a nonionic surfactant and an anionic surfactant, and with (i) a cationic stain blocking polymer chosen from 0.1 to 7 wt. %, based on the total weight of solids in the composition, of anion exchange resin beads having a weight average particle size of from 0.1 to 20 µm, and having a copolymerized crosslinker content of from 0.5 to 2.0 wt. %, based on the total weight of monomers used to make the anion exchange resin copolymer, from 1 to 30 wt. %, based on the total weight of solids in the composition, of a crosslinked cationic addition polymer which has from 20 wt. % to 96 wt. %, based on the total weight of monomers used to make the copolymer, of the copolymerized residue of a monomer chosen from a cationic monomer, a monomer that is modified to contain a cation and mixtures thereof, from 4 to 30 wt. % of a crosslinking monomer, and the remainder of an one or more other monoethylenically unsaturated monomer, and mixtures thereof, wherein when the cationic stain blocking polymer is an anion exchange resin bead it is chosen from gelular beads, beads having a dual morphology, and mixtures thereof.

11. The aqueous composition as claimed in claim 1, wherein the (ii) one or more emulsion copolymer has a copolymerization residue of one or more phosphorus acid monomer in the amount of from 0.3 to 3.0 wt. %, based on the total weight of monomers used to make the emulsion copolymer.

* * * * *